W. F. PFANDER.
MOTOR AND TRANSMISSION SUPPORTING FRAME FOR MOTOR VEHICLES.
APPLICATION FILED FEB. 2, 1912.
1,057,498.
Patented Apr. 1, 1913.
2 SHEETS—SHEET 1.
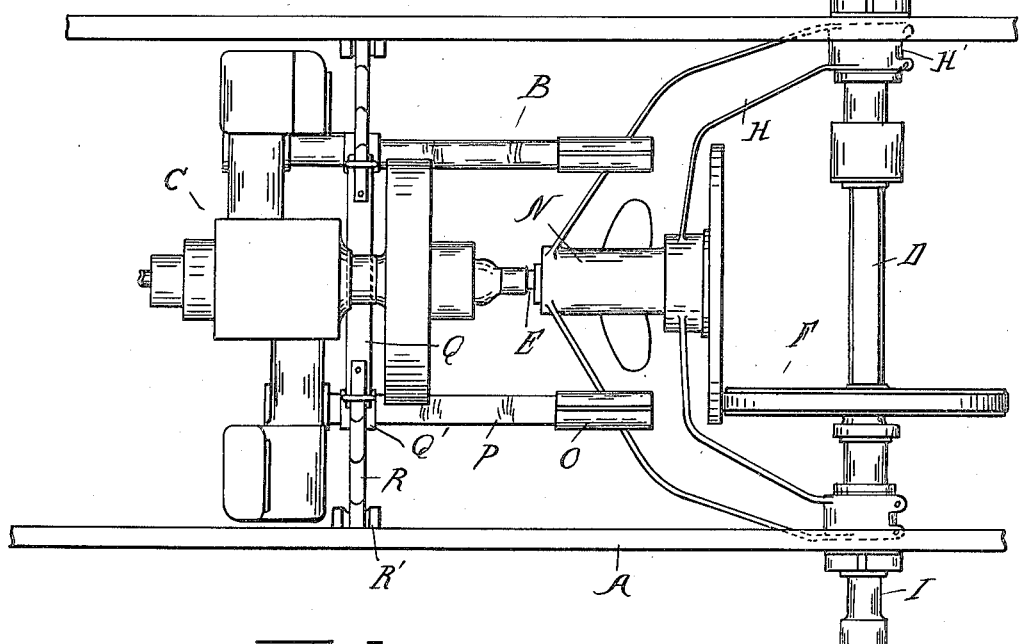
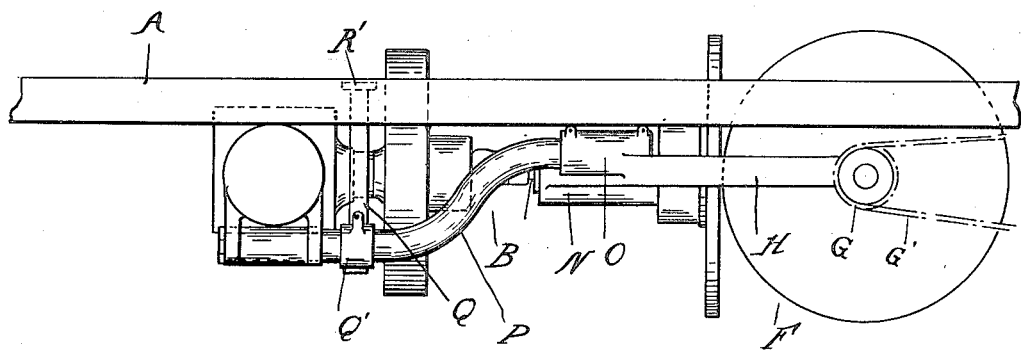
Witnesses
Inventor.
Walter F. Pfander
By Whittemore Hulbert & Whittemore
Attys W. F. PFANDER.
MOTOR AND TRANSMISSION SUPPORTING FRAME FOR MOTOR VEHICLES.
APPLICATION FILED FEB. 2, 1912.
1,057,498.
Patented Apr. 1, 1913.
2 SHEETS—SHEET 2.
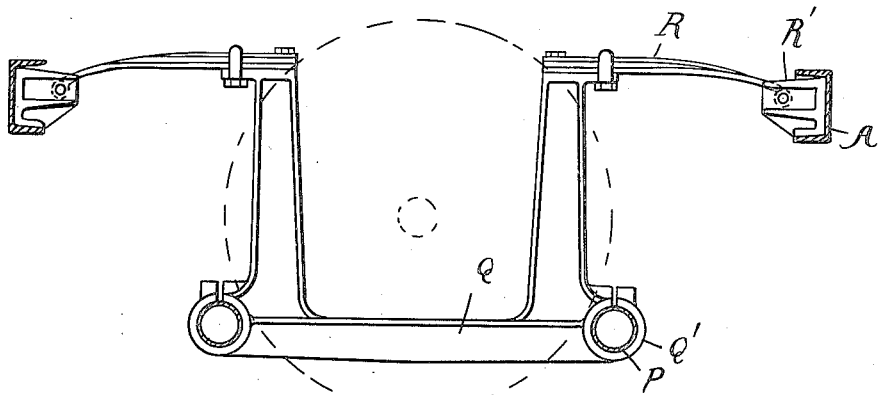
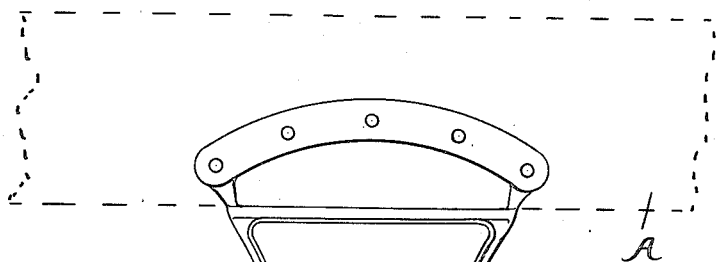
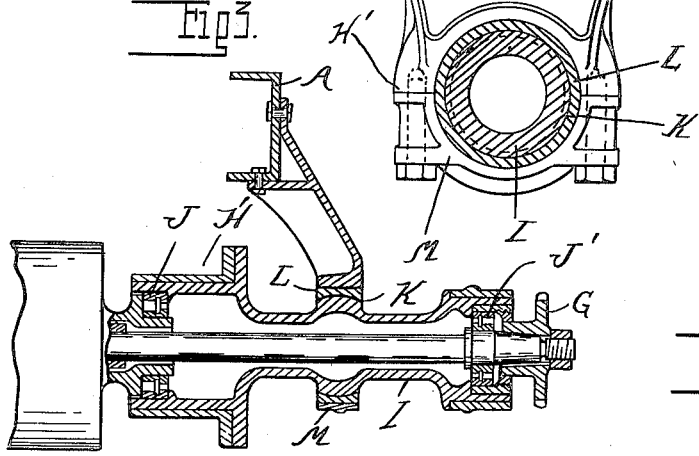
Witnesses
Inventor
Walter F. Pfander

UNITED STATES PATENT OFFICE.

WALTER F. PFANDER, OF FLINT, MICHIGAN, ASSIGNOR TO DURANT-DORT CARRIAGE COMPANY, OF FLINT, MICHIGAN, A CORPORATION OF MICHIGAN.

MOTOR AND TRANSMISSION SUPPORTING FRAME FOR MOTOR-VEHICLES.

1,057,498.

Specification of Letters Patent.

Patented Apr. 1, 1913.

Application filed February 2, 1912. Serial No. 674,983.

*To all whom it may concern:*

Be it known that I, WALTER F. PFANDER, a citizen of the United States of America, residing at Flint, in the county of Genesee and State of Michigan, have invented certain new and useful Improvements in Motor and Transmission Supporting Frames for Motor-Vehicles, of which the following is a specification, reference being had therein to the accompanying drawings.

The invention relates to motor vehicles of that type in which the drive wheels are driven through independent connections to a common jack-shaft between which and the motor a variable speed transmission is arranged.

It is the particular object of the present invention to provide a rigid frame on which the motor, jack-shaft and intermediate transmission are mounted, said frame permitting of the flexing or weaving of the main vehicle frame without any binding upon the operating parts.

To this end the invention consists in the construction as hereinafter set forth.

In the drawings,—Figure 1 is a plan view of a portion of the main frame of a motor vehicle showing the construction of the subframe and the mechanism mounted thereon; Fig. 2 is a side elevation; Fig. 3 is a cross section on line $x$—$x$ Fig. 1; Fig. 4 is a cross section showing the yieldable spring support for the frame; and Fig. 5 is a longitudinal section through the housing.

A are the side sills of the main frame which may be of any suitable construction but as shown are formed of channel bars, B is a subframe on the forward end of which is mounted a motor C and at the rear end a transversely arranged jack-shaft D.

E is a transmission shaft extending from the motor to the rear end of the frame and F is a variable speed gearing shown as consisting of friction gears and which transmit the motion of the shaft E to the jack-shaft D.

G are sprocket wheels at the opposite ends of the jack-shaft which are connected by chains G′ with the drive wheels not shown.

The frame B is supported from the main frame A in such a manner as to avoid the transmission of any of the weaving stresses developed in the main frame to the transmission mechanism. To this end the rear end of the frame in which the jack-shaft is journaled is pivotally connected to the main frame bars, while the forward end of the subframe on which the motor is mounted is resiliently attached to the main frame. Furthermore, the construction of the subframe is such as to provide internal rigidity.

In detail, H is an integral cast metal member in the form of a yoke, the furcations of which embrace the friction gearing and having mounted at their ends the bearings for the jack-shaft.

I are tubular housings secured in annular split clamping bearings H′ at the ends of the furcations of the yoke H, and J and J′ are anti-friction roller or ball bearings in said housings I and in which the jack-shaft is journaled. The housings I are clamped in position by the bearings H′ and upon said housing adjacent to said bearings are arranged spherical bearing portions K which engage a sectional spherical bearing ring L. The rings L are clamped in bracket bearings M which are secured to and depending from the side bars of the main frame A. The arrangement is such that the rings L which are external and of cylindrical form may be engaged with the brackets M and clamped in position while the spherical bearings K are free to move angularly in said rings L. The result is that any weaving or flexing of the main frame which throws the bracket bearings M out of alinement will merely result in slightly changing the position of the jack-shaft without subjecting it to any binding stress.

The cast metal yoke H is provided centrally with a bearing N for the transmission shaft and upon opposite sides of this bearing are sockets O in which parallel frame members P are secured. These frame members are bent to form a drop portion on which the engine C is mounted. This being preferably a double opposed cylinder construction arranged transversely of the frame, the proportion of the parts is such that the crank shaft of the engine alines with the bearing N thereby permitting the use of a straight transmission shaft from the engine to the friction gearing.

For supporting the forward end of the frame B and also for holding the frame bars P in rigid relation, a yoke Q preferably of cast metal is provided, this yoke being formed with sockets Q′ in which the frame bars P are secured. The yoke is of U-form arranged in a transverse vertical plane and at its upper ends are connected spring members R extending to the side bars of the main frame A and slidably engaging bearings R' therein. Thus the springs R form a yieldable or cushion support for the engine and forward portion of the frame B and also a flexible connection which will permit of the pivotal movement of the bearings K.

The friction gearing F is arranged in the space embraced by the furcations of the yoke and inasmuch as the bearings for both the shaft D and the shaft E are in the yoke, these are held in rigid relation to each other.

In operation, the motion of the engine is transmitted through the shaft E and bearing F to the jack-shaft E and from the latter through sprockets G and chains G' to the driving wheels. All of the bearings for this transmission are held in rigid relation to each other by the frame B while the latter is yieldably supported by the springs R and flexibly attached by the bearings K to the main frame.

What I claim as my invention is:

1. In a motor vehicle, the combination with the main frame, of a subframe comprising a rigid yoke or bifurcated member, a jack-shaft journaled in the furcations of said member and extending transverse therebetween, a transmission shaft perpendicular to said jack-shaft journaled in a central bearing in said yoke, a variable speed transmission between said transmission shaft and jack-shaft, frame members extending forward from said yoke, a motor mounted thereon in alinement with and connected to said transmission shaft, supporting hangers secured to the opposite sides of the main frame and pivotally engaging the furcations of said yoke, and a yieldable support for the forward portion of the subframe from said main frame.

2. In a motor vehicle, the combination with the main frame, of a subframe comprising a rigid yoke or bifurcated member having bearings in the furcations thereof for a transverse shaft and a central bearing for a longitudinally extending shaft, hangers on the main frame pivotally supporting the furcations of said yoke, a frame extending forward from said yoke, and a resilient yieldable support for said forwardly extending frame from said main frame.

3. In a motor vehicle, the combination with the main frame, of a subframe comprising a rigid yoke or bifurcated member having bearings in the furcations thereof for a transverse shaft, and a central bearing for a perpendicular or longitudinally extending shaft, socket bearings on said yoke on opposite sides of said central bearing, parallel frame bars engaging said socket bearings, a yoke for connecting the forward portions of said frame bars, a resilient support for said forward yoke from said main frame, and a pivotal support from said main frame for each of the furcations of said first mentioned yoke.

4. In a motor vehicle, the combination with the main frame, of a rigid yoke or bifurcated member having a central longitudinal shaft bearing, and clamping bearings at the end of each furcation, tubular housings secured in said clamping bearings in alinement with each other, spherical bearings on said tubular housings, depending brackets on said main frame having spherical socket bearings for the spherical bearings on said housings, a forwardly extending frame secured to said yoke, and a yieldable support for said forwardly extending frame from said main frame.

5. In a motor vehicle, the combination with the main frame, of a subframe comprising a rigid yoke or bifurcated member having a central longitudinally extending shaft bearing, parallel socket bearings on opposite sides thereof, and a clamping bearing at the end of each furcation, tubular housings secured in said clamping bearings in alinement with each other, spherical bearings on said tubular housing, brackets depending from said main frame having spherical sockets engaging said spherical bearings, frame members engaging and extending forward from the socket bearings in said yoke, a yoke connecting the forward portions of said frame members, and resilient arms extending from said forward yoke to said main frame and supported thereon.

6. In a motor vehicle, the combination with the main frame, of a subframe comprising a rigid integral yoke or bifurcated member having a central longitudinally extending shaft bearing, parallel socket bearings on opposite sides thereof and a clamping bearing at the end of each furcation, parallel frame members engaging each of said socket bearings and extending forward therefrom, a motor support at the forward end of said frame members in axial alinement with said central shaft bearing, a vertically arranged U-shaped yoke connecting said frame members intermediate said motor and first mentioned yoke, resilient arms extending oppositely from the upper ends of said vertical yoke and having bearings upon the main frame, tubular housings secured in said clamping bearings in alinement with each other, and hangers depending from the main frame pivotally engaging said tubular housings.

7. The combination with the main frame, of a subframe comprising a horizontally arranged rigid integral yoke or bifurcated member having a central longitudinally extending shaft bearing and parallel socket bearings on opposite sides thereof, frame bars engaging said socket bearings and extending forward therefrom with a depressed or dropped forward portion forming a motor support, a vertically arranged U-shaped yoke having its lower portion connecting the forward portions of said frame bars, resilient arms connected to the upper ends of said vertical yoke and extending to and supported upon the opposite sides of said main frame, and hangers depending from the opposite sides of said main frame and pivotally supporting the furcations of said horizontal yoke.

8. In a motor vehicle, the combination of a main frame, a subframe comprising a horizontally arranged integral rigid yoke or bifurcated member having a central longitudinally extending shaft bearing and alined transverse shaft bearings in the furcations thereof, an external spherical bearing for each furcation, sectional spherical socket bearings for engaging said external spherical bearings, the peripheral portions of said spherical socket bearings being cylindrical, and a bracket depending from the main frame having a clamping bearing for engaging said cylindrical portions of the spherical sectional bearings.

9. In a motor vehicle, the combination with the main frame, of a subframe comprising a rigid yoke or bifurcated member, a jack-shaft journaled in the furcations of said member and extending transverse therebetween, a transmission shaft perpendicular to said jack-shaft journaled in a central bearing in said yoke, a variable speed transmission between said transmission shaft and jack-shaft, hangers on the main frame pivotally supporting the furcations of said yoke, and a yieldable support for the forward portion of the subframe from said main frame.

In testimony whereof I affix my signature in presence of two witnesses.

WALTER F. PFANDER.

Witnesses:
 FRANCIS M. BUFFUM,
 GRANT J. BROWN.